(12) United States Patent
Wollaston et al.

(10) Patent No.: US 10,316,996 B2
(45) Date of Patent: Jun. 11, 2019

(54) LOCKING DEVICE

(71) Applicant: Airbus Operations Limited, Bristol (GB)

(72) Inventors: Timothy Wollaston, Bristol (GB); Samuel Evans, Bristol (GB)

(73) Assignee: Airbus Operations Limited, Bristol (GB)

(*) Notice: Subject to any disclaimer, the term of this patent is extended or adjusted under 35 U.S.C. 154(b) by 942 days.

(21) Appl. No.: 14/847,688

(22) Filed: Sep. 8, 2015

(65) Prior Publication Data

US 2016/0069504 A1 Mar. 10, 2016

(30) Foreign Application Priority Data

Sep. 8, 2014 (GB) .................................. 1415806.7

(51) Int. Cl.
| | |
|---|---|
| *F16L 19/00* | (2006.01) |
| *F16L 15/08* | (2006.01) |
| *F16L 57/02* | (2006.01) |
| *F16L 58/18* | (2006.01) |
| *B64C 1/14* | (2006.01) |
| *B64D 37/00* | (2006.01) |

(52) U.S. Cl.
CPC ............. *F16L 19/005* (2013.01); *F16L 15/08* (2013.01); *F16L 57/02* (2013.01); *F16L 58/182* (2013.01); *B64C 1/1453* (2013.01); *B64D 37/005* (2013.01); *F16L 2201/40* (2013.01)

(58) Field of Classification Search
CPC .................................................... F16L 19/005

USPC ................................................. 285/86, 89, 92
See application file for complete search history.

(56) References Cited

U.S. PATENT DOCUMENTS

| | | | |
|---|---|---|---|
| 408,320 A | | 8/1889 | Powell |
| 4,984,995 A | * | 1/1991 | Tucker ................ H01R 13/622 285/81 |
| 5,094,491 A | | 3/1992 | Berghammer et al. |
| 5,127,679 A | | 7/1992 | Pouplier |
| 5,215,336 A | * | 6/1993 | Worthing .............. F16L 19/005 285/319 |
| 5,348,349 A | | 9/1994 | Sloane |
| 5,362,111 A | * | 11/1994 | Harbin ................. F16L 19/005 285/330 |
| 5,374,085 A | * | 12/1994 | Beatrice ................. F16L 37/10 137/382 |

(Continued)

FOREIGN PATENT DOCUMENTS

| | | |
|---|---|---|
| GB | 624386 | 6/1949 |
| GB | 2482723 | 2/2012 |

(Continued)

*Primary Examiner* — James M Hewitt, II
(74) *Attorney, Agent, or Firm* — Nixon & Vanderhye P.C.

(57) ABSTRACT

An aircraft pipe coupling includes a first pipe end and a second pipe end connected to each other by a fastener. A locking collar restricts the rotational movement of the first pipe end, the second pipe end, and the fastener with respect to one another. The locking collar includes a first engagement portion and a second engagement portion, one of the engagement portions includes a resiliently deformable engagement surface. The first engagement portion is located over and engaged with the fastener, and the second engagement portion is located over and engaged with the second pipe end.

14 Claims, 5 Drawing Sheets

(56) References Cited

U.S. PATENT DOCUMENTS

| | | | |
|---|---|---|---|
| 5,388,866 A * | 2/1995 | Schlosser | F16L 19/005 |
| | | | 285/319 |
| 5,890,746 A | 4/1999 | Mueller | |
| 7,571,937 B2 * | 8/2009 | Patel | F16L 19/005 |
| | | | 285/386 |
| 9,279,526 B2 * | 3/2016 | McAlister | F16L 19/0231 |
| 2004/0090066 A1 | 5/2004 | Hoffmann | |
| 2006/0151994 A1 | 7/2006 | Marc et al. | |
| 2012/0175869 A1 | 7/2012 | Artini | |

FOREIGN PATENT DOCUMENTS

| | | |
|---|---|---|
| GB | 2514556 | 12/2014 |
| WO | 2006/108724 | 10/2006 |

\* cited by examiner

LOCKING DEVICE

RELATED APPLICATION

This application claims priority to United Kingdom (GB) patent application GB1415806.7, filed Sep. 8, 2014, the entirety of which is incorporated by reference.

BACKGROUND OF THE INVENTION

The present invention concerns an aircraft pipe joint. More particularly, but not exclusively, this invention concerns a locking device for an aircraft pipe joint. The invention also concerns a locking device for an aircraft fuel pipe joint.

Aircraft pipe joints, for example in aircraft fuel systems, often include a washer disposed between a first pipe end and a second pipe end. The first pipe end and second pipe end are typically connected with at least one nut disposed on the outer surface of either the first pipe end or second pipe end. For aircraft pipe joints, especially in aircraft fuel systems, it is essential that there is no leakage from the pipe joint into the surrounding environment. Such leakage can damage the aircraft, possibly in a serious manner. Pipe joints, for example slat track drain hose connections, may require "double locking" in order to comply with aircraft safety regulations. Such a double locking arrangement may be provided by first locking the pipe joint by the engagement of the pipe connectors. Such an arrangement may be, for example, a nut on disposed on the outer surface of a pipe end. Wire locking may be used to provide a secondary lock on the drain hoses.

However, wire locking may result in fragments of wire entering the aircraft fuel filter system and causing damage. Wire locking may also increase the complexity and/or installation and/or maintenance time when manufacturing or maintaining an aircraft.

SUMMARY OF THE INVENTION

The present invention seeks to mitigate the above-mentioned problems. Alternatively or additionally, the present invention seeks to provide an improved aircraft pipe coupling arrangement.

The present invention provides an aircraft pipe coupling comprising a first pipe end and a second pipe end, the first pipe end connected to the second pipe end with a fastener; and a locking collar, the locking collar comprising a first engagement portion and a second engagement portion, the first engagement portion located over and engaged with the fastener, and the second engagement portion located over and engaged with one of the first pipe end and the second pipe end, wherein the locking collar is arranged to restrict the rotational movement of the fastener, the first pipe end, and second pipe end with respect to one another, and one of the first engagement portion and second engagement portion comprises a resiliently deformable engagement surface.

The aircraft pipe coupling may be an aircraft fuel pipe coupling.

The fastener may be a nut. The first pipe end and second pipe end may be connected via an external threaded arrangement on the outer surfaces of the first pipe end and second pipe end and a nut located over the threaded arrangement. The first pipe end and/or second pipe end may comprise an external protrusion shaped like a nut, for example with a hexagonal cross section, in order to allow the first pipe end and/or second pipe end to be secured in position during connection of the first pipe end with the second pipe end.

Advantageously, the locking collar is arranged to prevent rotational movement of the fastener, the first pipe end, and second pipe end, with respect to one another. The first engagement portion may be arranged to conform in shape to the nut. For example, when the nut is a hexagonal nut, the first engagement portion may comprise a hexagonal aperture configured to fit over and engage with the hexagonal nut. The second engagement portion may be arranged to conform in shape to part of the first pipe end or second pipe end. For example, when a pipe end comprises a hexagonal nut or nut like protrusion, the second engagement portion may comprise a hexagonal aperture configured to fit over and engage with the hexagonal nut. The second engagement portion may be configured to engage with a nut larger than the fastener. In such a case, there may be a shoulder between the first engagement portion and the second engagement portion. The shoulder may be arranged to abut the second pipe end to ensure the locking collar is correctly located.

The second engagement portion may comprise a resiliently deformable engagement surface. Providing a resiliently deformable engagement surface may allow use of the locking collar without requiring precise alignment of the fastener, the first pipe end, and second pipe end. This may increase the ease of use of the locking collar and/or the speed of installation of the locking collar. The resiliently deformable engagement surface may secure the locking collar in position, such that in normal use, the locking collar does not become disengaged from the fastener and the pipe end. The resiliently deformable engagement surface may comprise a metal or plastic clip. The clip may be housed in an aperture configured to be larger than the pipe end with which it is intended to be engaged, such that the clip and housing may be placed over the pipe end, and the clip engaged with the pipe end. The clip may be folded and/or crimped to increase the resilience of the clip and facilitate the engagement of the clip with the pipe end. There may be a plurality of clips provided. The clip may be any shaped protrusion suitable for engaging with a pipe end.

The first engagement portion may also comprise a resiliently deformable engagement surface. The resiliently deformable engagement surface may be as described with reference to the resiliently deformable engagement surface of the second engagement portion. Providing resiliently deformable engagement surfaces at both pipe engagement portions may provide an especially secure engagement with the pipe coupling.

The locking collar may comprise a one-piece device. Such a device may be moulded and/or machined. The locking collar may comprise a two piece device, such that the collar may be split prior to engagement with a pipe coupling, and then engaged together over the pipe coupling. The collar may be clamped or locked in position, in a "clam shell" type arrangement. This may provide an easy and quick way of installing the locking collar.

The locking collar may comprise a brightly coloured material. Providing a brightly coloured material may allow for easy visual checks to be performed during manufacture or maintenance procedures, for example checking that the locking collar is located correctly.

According to a second aspect of the invention there is also provided a locking collar comprising a first engagement portion configured to fit over and engage with a fastener and a second engagement portion configured to fit over and engage with a pipe end, wherein one of the first engagement portion and second engagement portion comprises a resiliently deformable engagement surface.

The pipe end may engage an external protrusion, for example a nut or nut like form, with which the second engagement portion is configured to fit over and engage.

The first engagement portion may comprise an aperture arranged to correspond in approximate size and shape with the fastener. The second engagement portion may comprise an aperture arranged to correspond in approximate size and shape with a first or second pipe end. The second engagement portion may comprise a resiliently deformable engagement surface. The resiliently deformable engagement surface may allow the locking collar to be used without requiring the precise alignment of a fastener, a first pipe end and second pipe end. The first pipe end engagement portion may comprise a resiliently deformable engagement surface.

The first engagement portion and second engagement portion may be different sizes. For example, the fastener may be smaller than a protrusion extending from the first or second pipe end, and the locking collar may be adapted such that the engagement portions are correctly sized to engage with the different sized elements. The locking device may comprise a shoulder between the first engagement portion and the second engagement portion. The shoulder may ensure that the locking collar is correctly located when installing the locking collar on a pipe coupling.

The invention provides, according to a third aspect, a method of locking an aircraft fuel pipe coupling, comprising the steps of: joining a first pipe end to a second pipe end with a fastener, providing a locking collar as described with respect to the second aspect of the invention, and locating the locking collar over the aircraft fuel pipe coupling, such that the first engagement portion is in engagement with the fastener and second engagement portion is in engagement with one of the first pipe end and second pipe end.

The location of the locking collar over the aircraft fuel pipe coupling may comprise the step of sliding the locking collar into position. The locking collar may include a shoulder located between the first engagement portion and second engagement portion It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

FIGS. 1A, 1B, 1C, and 1D, show a locking collar 10 according to a first embodiment of the invention. The locking collar 10 comprises a first engagement portion 12 and a second engagement portion 14. The first engagement portion 12 comprises an aperture shaped and sized to fit over and engage with a fastener, the fastener comprising a nut associated with a first pipe end. In this case, the aperture is hexagonal, which corresponds to the shape of the nut with which the first engagement portion 12 is intended to engage. The second engagement portion 14 comprises an aperture shaped and sized to fit over a pipe end, the pipe end comprising a nut. The second engagement portion also comprises a resiliently deformable engagement surface. The resiliently deformable engagement surface comprises a flexible clip 16 which is shaped and sized to fit over and engage with a second pipe end. The flexibility of the clip 16 allows the second engagement portion 14 to engage with a pipe end, even when the external surfaces of the nuts of the first pipe end and second pipe end are not in precise alignment with each other. Therefore, the ease of use of the locking collar 10 is increased, and the installation speed may also be increased.

Figure 1A:
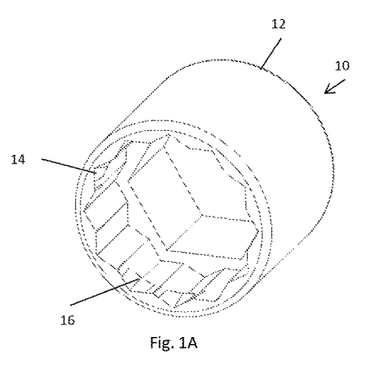
FIG. 1A shows a schematic view of a locking collar according to a first embodiment of the invention.
Figure 1B:
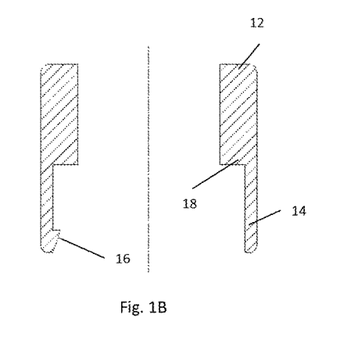
FIG. 1B shows a cross-sectional view of the locking collar according to a first embodiment of the invention.
Figure 1C:
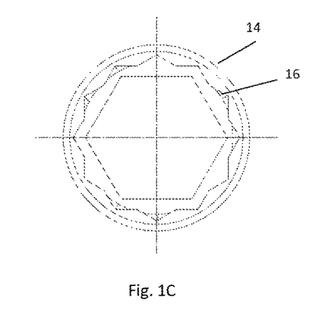
FIG. 1C shows a bottom view of the locking collar according to a first embodiment of the invention.
Figure 1D:
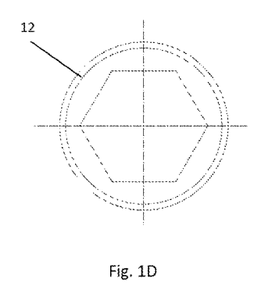
FIG. 1D shows a plan view of the locking collar according to a first embodiment of the invention.
Figure 2:
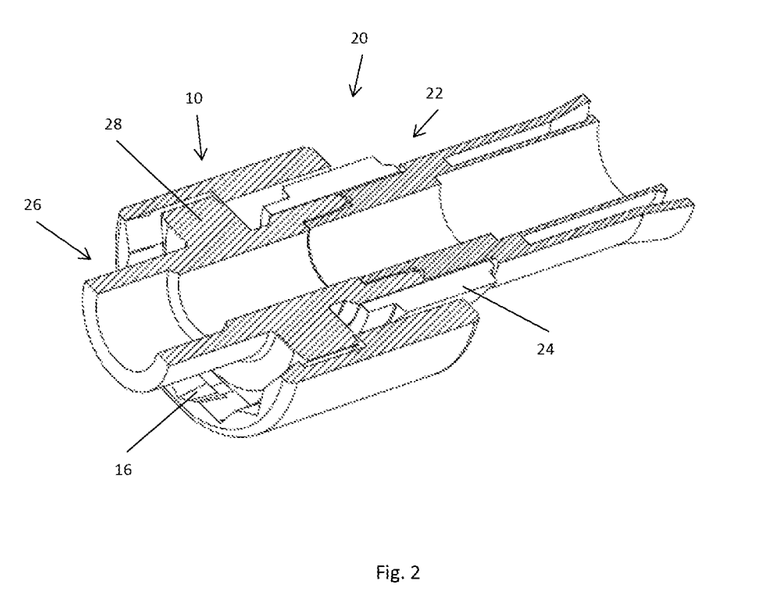
FIG. 2 shows an aircraft fuel pipe coupling including the locking collar as shown in FIG. 1, providing a second embodiment of the invention.

FIG. 2 shows the locking collar 10 engaged with a fuel pipe coupling 20. The fuel pipe coupling comprises a first pipe end 22 including a first nut 24 and a second pipe end 26 including a protrusion providing a second nut 28. The first pipe end 22 and second pipe end 26 are joined together via an external threaded arrangement and the first nut 24. The locking collar 10 is installed in position after the two pipe ends have been joined. The locking collar 10 is slid into the position as shown, moving the locking collar from the first pipe end side of the coupling, over the first pipe end 22 until first engaging portion 12 is engaged with the first nut 24 of the first pipe end 22 and the second engaging portion 14 is engaged with the second nut 28 of the second pipe end 26. As can be seen, the clip 16 engages with the second nut 28, and rotation of the first nut 24 and second nut 28 relative to each other is restricted or prevented. In this embodiment of the invention, the second nut is formed as an integral part of the second pipe end. However, the skilled person will appreciate that the second nut may be joined to the second pipe end as a separate element, and for example, welded or otherwise fastened in position.

As can be seen in FIGS. 1A-D, and FIG. 2, the locking collar 10 is configured for engagement with a first nut 24 and a second nut 28, where the second nut 28 is larger than the first nut 24. Therefore, the respective apertures in the first portion 12 and second engagement portion 14 are different sizes, and a shoulder 18 exists between the first engagement portion 12 and the second engagement portion 14. When installed on a fuel pipe coupling 20, it can be seen that the shoulder 18 acts as a stop against the second nut 28, helping ensure that the locking collar is correctly located. However, in alternative embodiments, the locking collar may be configured for engagement with pipe ends of the same or similar size, and such a shoulder may be omitted.

Figure 3:
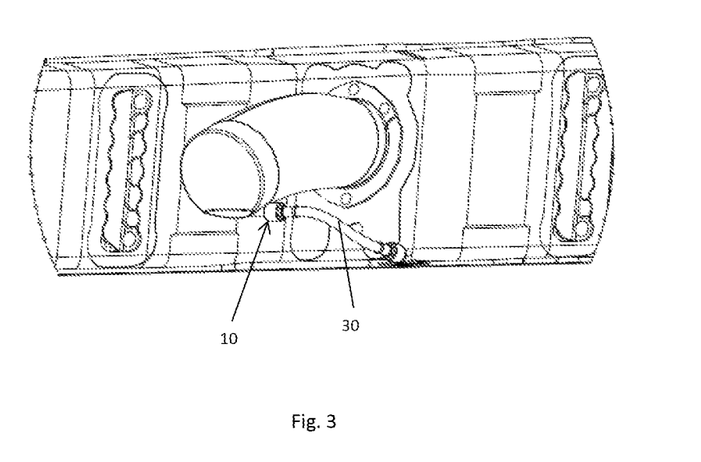
FIG. 3 shows the locking collar according to the first embodiment of the invention, installed on a track cam drain in an aircraft fuel system according to a third embodiment of the invention.
Figure 4:
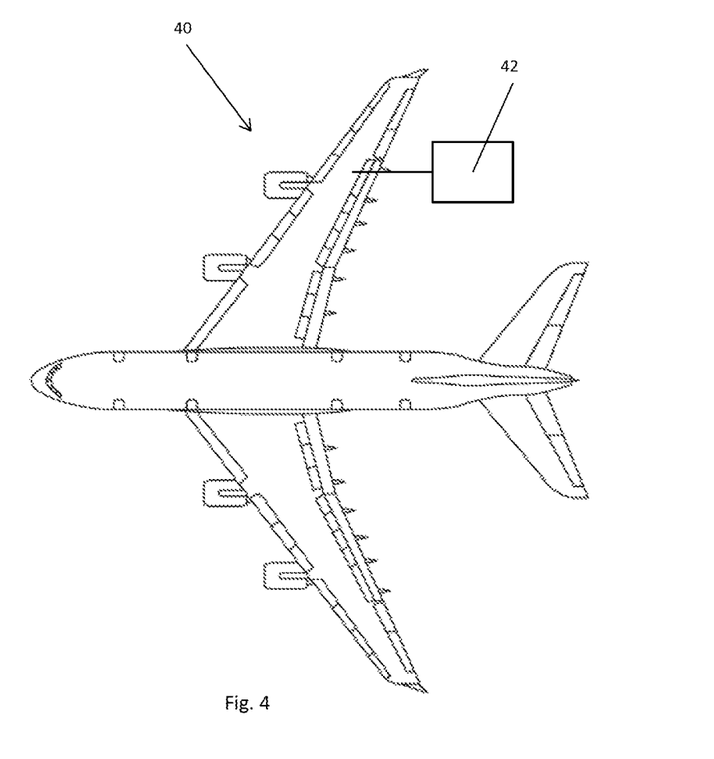
FIG. 4 shows an aircraft including an aircraft fuel system, the fuel system comprising a pipe coupling as shown in FIG. 2.

FIG. 3 shows the locking collar installed as a double locking arrangement on a track can drain hose 30 in an aircraft fuel system. FIG. 4 shows an aircraft 40 including an aircraft fuel system 42 including a locking collar 10 installed on a fuel pipe coupling as described with relation to FIGS. 1 and 2. The aircraft fuel system 42 is configured to supply fuel to the aircraft engines.

Figure 5A:
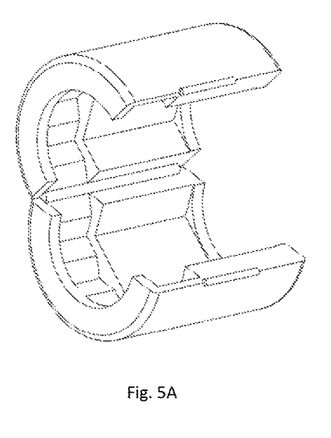
FIGS. 5A and 5B shows a variant of the locking collar as described with reference to FIGS. 1A to 1D.
Figure 5B:
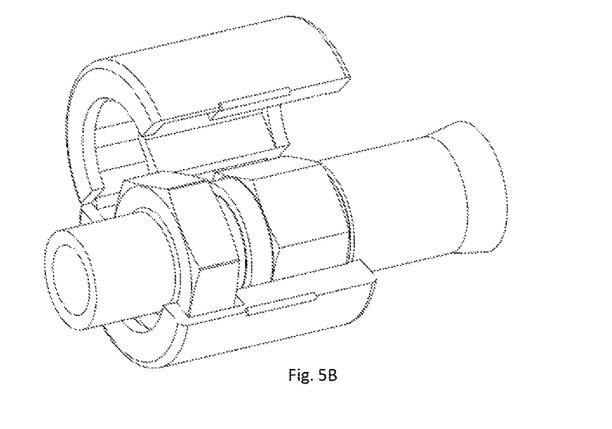

Whilst the present invention has been described and illustrated with reference to particular embodiments, it will be appreciated by those of ordinary skill in the art that the invention lends itself to many different variations not specifically illustrated herein. By way of example only, certain possible variations will now be described. For example, the locking collar 10 may be hinged in order to allow the collar to be opened, positioned over a pipe coupling, and engaged with the pipe coupling as described above. Such a locking collar is illustrated in FIGS. 5A and 5B, wherein in FIG. 5A the locking collar is shown in an open position, and in FIG. 5B the locking collar is shown in an open position just prior to being closed in position over a pipe coupling. Alternatively the locking collar may be two separate halves which may be placed over a pipe coupling and joined with a clip or other fastening arrangement.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both.

The invention claimed is:

1. An aircraft pipe coupling comprising:
   a first pipe end and a second pipe end, the first pipe end connected to the second pipe end with a fastener, wherein the fastener overlaps the first and second pipe ends; and
   a locking collar comprising an sidewall extending entirely around a perimeter of a passage extending through the locking collar, wherein the sidewall extends continuously from a first end to a second end of the locking collar, and the sidewall has an interior surface defining the passage,
   the interior surface includes a first engagement portion extending from the first end of the locking collar and along a portion of the interior surface, and the interior surface includes a second engagement portion extending from the second end of the locking collar along a second portion of the interior surface,
   the first engagement portion overlaps and engages the fastener;
   the second engagement portion, overlaps and engages an outer peripheral surface of an annular extension on one of the first pipe end and the second pipe end,
   wherein the second engagement portion includes a resiliently deformable engagement surface which engages a face of the annular extension, wherein the face is transverse to the outer peripheral surface of the annular extension;
   wherein the locking collar is arranged to restrict relative rotational movement of the fastener, the first pipe end, and second pipe end, and
   wherein the annular extension has a diameter greater than a diameter of the fastener, and a second face of the annular extension is configured to abut against a shoulder in the interior surface of the locking collar, wherein the shoulder is between the first and second engagement portions.

2. The aircraft pipe coupling as claimed in claim 1, wherein the first engagement portion is arranged to conform in shape to an outer surface of the fastener.

3. The aircraft pipe coupling as claimed in claim 1, wherein the second engagement portion is arranged to conform to the outer peripheral surface of the annular extension.

4. The aircraft pipe coupling as claimed in claim 1, comprising a shoulder between the first engagement portion and the second engagement portion.

5. The aircraft pipe coupling as claimed in claim 1, wherein the second engagement portion comprises an annular array of flat surfaces that conform to an annular array of flat surfaces forming the outer peripheral surface of the annular extension.

6. The aircraft pipe coupling as claimed in claim 1, wherein the first engagement portion comprises a resiliently deformable engagement surface.

7. The aircraft pipe coupling as claimed in claim 1, wherein the locking collar comprises a one-piece device.

8. The aircraft pipe coupling as claimed in claim 1, wherein the locking collar comprises a two piece device.

9. The aircraft pipe coupling of claim 1, wherein the fastener is a first fastener and the annular extension is a second fastener.

10. The aircraft pipe coupling of claim 9, wherein the first fastener is a first nut.

11. A method of locking an aircraft pipe coupling comprising:
    joining a first pipe end to a second pipe end with a fastener, wherein the fastener engages both the first and second pipe ends;
    after the joining of the first and second pipe ends, sliding a hollow locking collar over the fastener to engage a first engagement portion of an interior surface of the hollow locking collar with an outer surface of the fastener such that the first engagement portion overlaps the outer surface of the fastener;
    further sliding of the hollow locking collar to engage a second engagement portion of the interior surface of the locking collar with an outer peripheral surface of an annular protrusion on second pipe end, wherein the annular protrusion has a diameter greater than a diameter of the fastener, the annular protrusion is configured to abut against a shoulder in the interior surface of the locking collar, and the shoulder is between the first and second engagement portions;
    as the hollow locking collar slides over the outer peripheral surface of the annular protrusion, a deformable, resilient clip on the second engagement portion is deformed radially outward by the annular protrusion;

the deformable resilient clip automatically moves radially inward as the deformable resilient clip slides past the outer peripheral surface of the annular protrusion, and thereafter the deformable resilient clip engages a face of the annular protrusion which is transverse to the outer peripheral surface to lock the locking collar in position over the fastener and the annular protrusion, and preventing relative rotational movement of the locking collar, the first pipe end and the second pipe end by the engagements between the locking collar with the fastener and the annular protrusion.

12. The method of claim 11 wherein the face of the annular protrusion is a first face and the annular protrusion includes a second face, opposite to the first face, and the hollow locking collar includes a shoulder on the interior surface and between the first and second engagement portions, wherein the method further includes abutting the shoulder against the second face of the annular protrusion.

13. The method of claim 11 wherein the fastener is a first fastener and the annular protrusion is a second fastener, and the method further includes mounting the second fastener to the second pipe end before the sliding of the locking collar over the second pipe end.

14. The method of claim 13, wherein the first fastener is a first nut and the second fastener is a second nut.

* * * * *